United States Patent [19]

Morimoto et al.

[11] Patent Number: 4,686,675
[45] Date of Patent: Aug. 11, 1987

[54] CHANNEL SWITCHING SYSTEM

[75] Inventors: Hideaki Morimoto; Hiromi Hashimoto, both of Tokyo, Japan

[73] Assignee: NEC Corporation, Tokyo, Japan

[21] Appl. No.: 795,132

[22] Filed: Nov. 5, 1985

[30] Foreign Application Priority Data

Nov. 5, 1984 [JP] Japan .................. 59-232711

[51] Int. Cl.$^4$ .................. G06F 11/20; H04L 1/02
[52] U.S. Cl. .................. 371/8; 340/825.01; 370/16
[58] Field of Search .............. 371/8; 370/16; 375/38, 375/40; 340/825.01; 455/8, 10, 52

[56] References Cited

U.S. PATENT DOCUMENTS

| | | | |
|---|---|---|---|
| 4,228,535 | 10/1980 | Workman et al. | 370/16 |
| 4,417,348 | 11/1983 | Abbruscato | 340/825.01 X |
| 4,442,518 | 4/1984 | Morimoto | 371/8 |
| 4,455,645 | 6/1984 | Mijioka et al. | 370/16 |
| 4,477,895 | 10/1984 | Casper et al. | 370/16 |

*Primary Examiner*—Charles E. Atkinson
*Attorney, Agent, or Firm*—Sughrue, Mion, Zinn, Macpeak and Seas

[57] ABSTRACT

A channel switching system in a digital radio transmission circuit with at least one regular channel and a standby channel has a received signal supply circuit, signal frequency divider circuits, signal order change circuits, a comparator, a hitless signal switching circuit and a frequency multiplier. Each channel transmits a digital multiplexed signal including a data signal of N (N is an integer of 1 or more) strings. The received signal supply circuit supplies a data signal to a receiving-side regular channel through a standby channel when a corresponding transmitting-side regular channel has a circuit failure. The signal frequency divider circuits N frequency-divide a data signal received through a regular channel and the data signal received through the received signal supply circuit. The signal order change circuits change orders of the N signal strings in response to different signal order change signals. The comparator supplies the regular or standby N signal string to the signal order change circuit when a noncoincidence is established, but generates a coincidence signal when a coincidence is established. The hitless signal switching circuit receives the signal string from the signal order change circuit and generates the regular or standby channel signal string in accordance with the coincidence signal from the comparator. The frequency multiplier multiplies an output from the hitless signal switching circuit with N.

4 Claims, 21 Drawing Figures

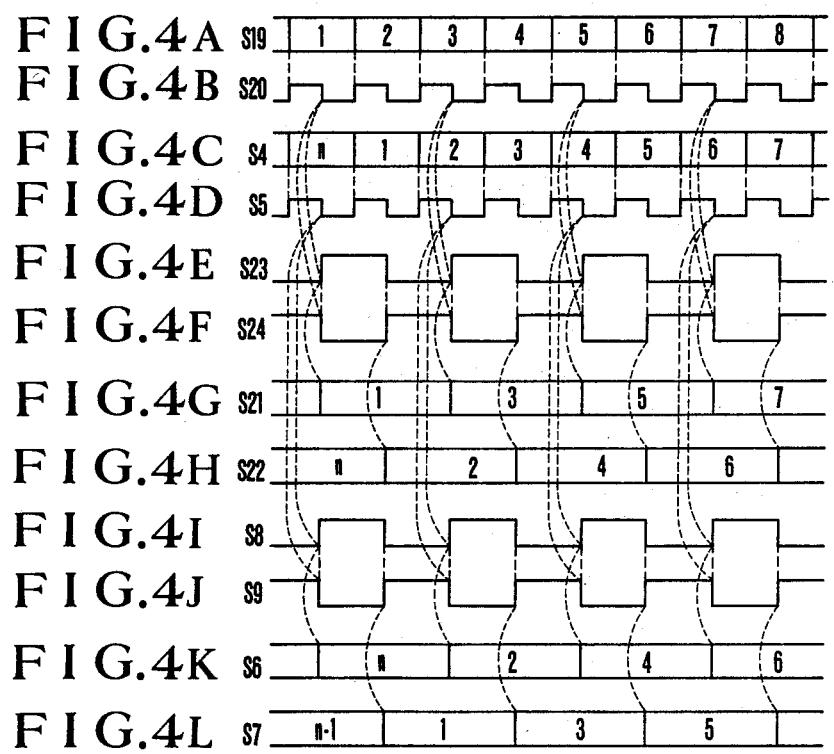

CHANNEL SWITCHING SYSTEM

BACKGROUND OF THE INVENTION

The present invention relates to a channel switching system and, more particularly, to a channel switching system for switching between a regular channel and a standby channel without bit error regardless of the presence of fading in a digital radio transmission channel.

In a conventional digital radio transmission circuit, a standby channel is assigned to a plurality of regular channels in consideration of operational availability of the regular channels and their equipment failure. When a given regular channel fails, it is switched to the standby channel. Problems of operational availability of the regular channels occur when maintenance and inspection are performed for the transmission lines of the regular channels and an anti-fading measure is required. In this case, a hitless channel switching system for switching the regular and standby channels has the most significance in respect of operational availability of a digital radio transmission circuit.

FIG. 1 is a block diagram showing the main parts of the transmitting and receiving sides of a digital radio transmission circuit to which a conventional channel switching system is applied. This transmission circuit has first, second, . . . mth regular channels. Referring to FIG. 1, digital multiplexed signals S44-1, S44-2, . . . S44-m supplied from a predetermined multiplexer/-demultiplexer unit (not shown) are supplied to split circuits 38-1, 38-2, . . . 38-m, respectively. First split outputs are supplied to bipolar-to-unipolar (to be referred to as a B/U hereinafter) converters 41-1, 41-2, . . . 41-m of the respective channels, and second split outputs are supplied to corresponding switching circuits 39-1, 39-2, . . . 39-m. In normal operation, these digital multiplexed signals are converted from bipolar signals to unipolar signals by the B/U converters 41-1, 41-2, . . . 41-m. Transmitting signal processing circuits (XMTG SIG PROC CKTs) 42-1, 42-2, . . . 42-m insert frame sync bits and parity bits into the unipolar signals, respectively. The transmitting data are supplied to the receiving side through transmitting signal distribution circuits (XMTG SIG DISTR CKTs) 44-1, 44-2, . . . 44-m and a modulator/transmitter (MOD & XMTR) 45. A pilot signal from a pilot generator 40 arranged in the transmitting side is always transmitted to the receiving side through the switching circuits 39-1, 39-2, . . . 39-m, a B/U converter 41, a transmitting signal processing circuit 42, a transmitting signal switching circuit 43 and the modulator/transmitter 45.

At the receiving side, the digital multiplexed signals of the respective regular channels which are received and demodulated through a receiver/demodulator 46 are supplied to frame sync circuits (FRAME SYNC CKTs) 47-1, 7-2, . . . 47-m which detect the corresponding frame sync bits. The bits of the digital multiplexed signals which are added at the transmitting side are then separated therefrom by received signal processing circuits (RECD SIG PROC CKTs) 50-1, 50-2, . . . 50-m through received signal sync switching circuits (RECD SIG SYNC SWs) 49-1, 49-2, . . . 49-m. The separated signals are converted from the unipolar signals to bipolar signals by unipolar-to-bipolar (U/B) converters 51-1, 51-2, . . . 51-m. The bipolar signals are then supplied as digital multiplexed signals S45-1, S45-2, . . . S45-m to a multiplexer/demultiplexer unit through switching circuits (SWs) 52-1, 52-2, . . . 52-m. In the standby channel at the receiving side, the pilot signal from the receiver/-demodulator 46 is supplied to a pilot detector (PILOT DET) 53 through a frame sync circuit (FRAME SYNC CKT) 47, a received signal distribution circuit (RECD SIG DISTR CKT) 48, a received signal processing circuit (RECD SIG PROC CKT) 50, a U/B converter 51 and the switching circuits 52-1, 52-2, . . . 52-m. The pilot signal is used to always monitor the standby channel while the regular channels are in operation so as to immediately switch between the regular and standby channels.

A case will be exemplified wherein a second regular channel is switched to the standby channel due to a circuit failure. When the first to mth regular channels are operated in the normal state, the digital multiplexed signals from the transmitting signal distribution circuits 44-1, 44-2, . . . 44-m are supplied to the modulator/transmitter 45 and the transmitting signal switching circuit 43 of the standby channel, as described above. When the second regular channel is replaced with the standby channel, an input to the transmitting signal switching circuit 43 is switched in accordance with a predetermined protocol. The digital multiplexed signal for the second regular channel is supplied in place of the pilot signal to the modulator/transmitter 45 of the standby channel and is transmitted to the receiving side. In this state, the digital multiplexed signal for the second regular channel is transmitted to the receiving side through two transmission circuits as the second regular and standby channels.

The digital multiplexed signal sent through the second regular channel is supplied to the received signal sync switching circuit 49-2 through the receiver/-demodulator 46 and the frame sync circuit 47-2. Meanwhile, the multiplexed signal from the standby channel is supplied to the received signal sync switching circuit 49-2 through the receiver/demodulator 46, the frame sync circuit 47 and the received signal distribution circuit 48. The received signal sync switching circuit 49-2 compares the data bit information as the reference data of the regular system with the data bit of the digital multiplexed signal of the standby channel. When the data bits of the regular and standby channels match with each other, the regular channel is switched to the standby channel. The digital multiplexed signal through the standby channel is supplied to the multiplexer/-demultiplexer unit through the received signal sync switching circuit 49-2, the received signal processing circuit 50-2, the U/B converter 51-2 and the switching circuit 52-2. A circuit break due to the failure of the second regular channel can be prevented.

When a failure occurs in the B/U converter 41-2, the transmitting signal processing circuit 42-2 or the transmitting signal distribution circuit 44-2 of the second channel at the transmitting side, or a failure occurs in the received signal sync switching circuit 49-2, the received signal processing circuit 50-2 or the U/B converter 51-2 of the regular channel at the receiving side, the switch circuit 39-2 is operated to supply the digital multiplexed signal S44-2 instead of the pilot signal to the B/U converter 41 of the standby channel. The signal is supplied to the receiving side through the transmitting signal processing circuit 42, the transmitting signal switching circuit 43 and the modulator/transmitter 45 corresponding to the standby channel. At the receiving side, the digital multiplexed signal sent through the standby channel is supplied to the switching circuit 52-2 through the receiver/demodulator 46, the frame sync circuit 47, the received signal distribution circuit 48, the received signal processing circuit 50 and the U/B converter 51. The resultant signal is supplied as the digital multiplexed signal S45-2 to the multiplexer/demultiplexer unit.

In the conventional channel switching system described above, the transmitting signal switching circuit is arranged in the standby channel between the transmitting regular and standby channels, and at the same time, the transmitting signal distribution circuits are arranged in the regular channels, respectively. The transmitting circuit arrangement is complex and large. Furthermore, control of switching between the regular and standby channels is functionally complex. Frame sync errors occur in the frame sync circuit of the standby channel at the receiving side and prolong the channel switching time, thereby degrading channel efficiency.

SUMMARY OF THE INVENTION

It is an object of the present invention to provide a channel switching system which eliminates the conventional drawbacks described above.

In order to achieve the above object of the present invention, there is provided a channel switching system in a digital radio transmission circuit consisting of a predetermined number of regular and standby channels, comprising: signal supplying means for supplying to a receiving regular channel a digital multiplexed signal supplied through the standby channel from a predetermined transmitting regular channel which has a circuit failure, the predetermined transmitting regular channel corresponding to the receiving regular channel; signal frequency-dividing means for dividing the digital multiplexed signal supplied to the receiving side through the regular channel and the digital multiplexed signal supplied to the receiving side through the standby channel at a frequency division ratio of N (N is an integer of not less than 1); signal order changing means for independently changing orders of data strings of the digital multiplexed signals supplied from the signal frequency-dividing means through the regular and standby channels in response to independent order change control signals; bit comparing means for comparing data bit information of the digital multiplexed signals sent from the regular and standby channels through the signal order changing means with as reference data bit information of a digital multiplexed signal of one of the predetermined regular channel and the standby channel and for generating the order change control signal corresponding to the coincidence/noncoincidence of the data bit information; hitless signal switching means for switching between the digital multiplexed signals of the predetermined regular channel and the standby channel at a time when the data bit information of the regular channel from the signal order changing means coincides with that of the standby channel therefrom under the control of the order change control signal; and signal multiplying means for multiplying with N the digital multiplexed signal of the selected channel which is generated from the hitless signal switching means.

BRIEF DESCRIPTION OF THE DRAWINGS

FIGS. 4A to 4L are respect timing charts for explaining the operation of the received signal hitless switching circuit.

DETAILED DESCRIPTION OF THE PREFERRED EMBODIMENT

The present invention will be in detail with reference to the accompanying drawings.

Figure 2A:
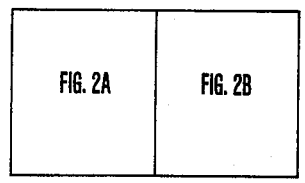
FIGS. 2A and 2B, is a block diagram showing the main part of a digital radio transmission circuit according to an embodiment of the present invention.
Figure 2A:
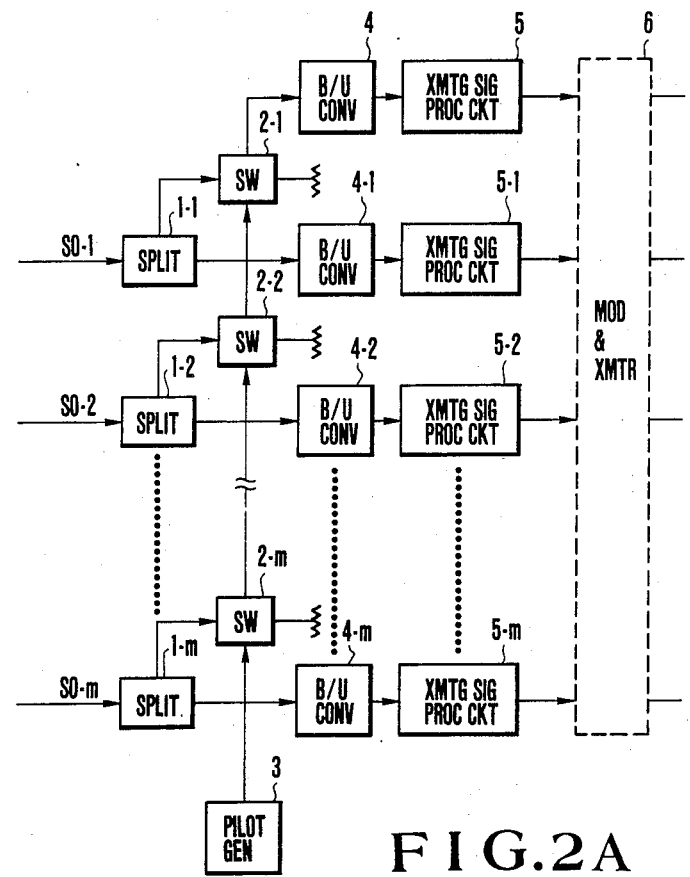
Figure 2B:
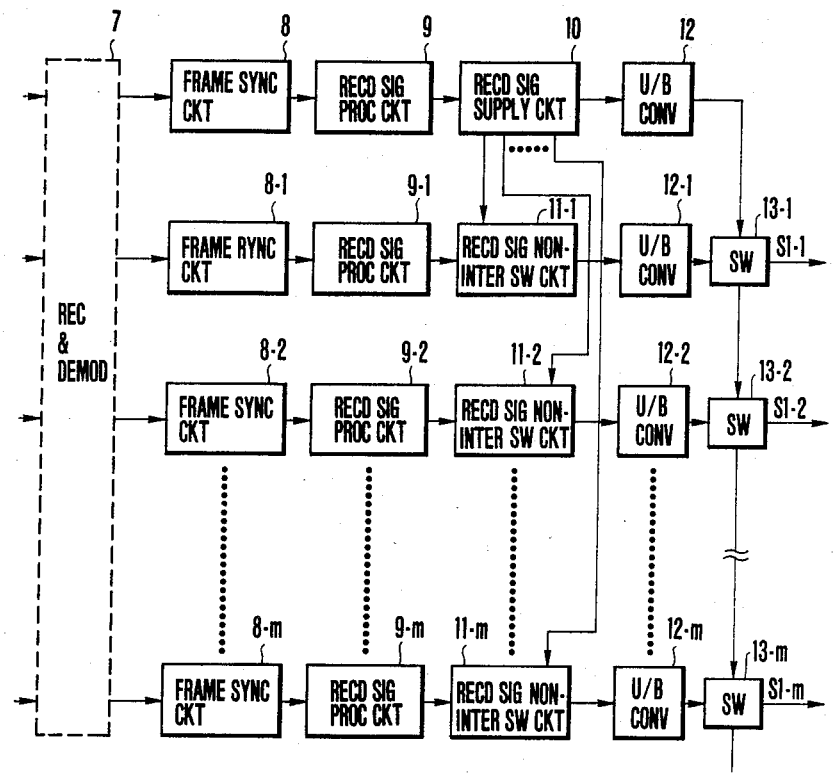

FIG. 2 is a block diagram showing the main parts of transmitting and receiving sides of a digital radio transmission circuit according to an embodiment of the present invention.

The digital radio transmission circuit has one standby channel and first to mth channels. The transmitting side comprises split circuits 1-1 to 1-$m$, switching circuits (SWs) 2-1 to 2-$m$, a generator (PILOT GEN) 3, B/U converters (B/U 4-1 to 4-$m$, transmitting signal processing circuits (XMTG SIG PROC CKTs) 5, 5-1 to 5-$m$ and a modulator/transmitter (MOD & XMTR) 6. The receiving side comprises a receiver/demodulator (REC & DEMOD) 7, frame sync circuits 8, 8-1 to 8-$m$, received signal processing circuits (RECD SIG PROC CKTs) 9, 9-1 to 9-$m$, a received signal supply circuit (RECD SIG SUPPLY CKT) 10, received signal hitless switching circuits (RECD SIG HITLESS SW CKTs) 11-1 to 11-$m$, U/B converters 12, 12-1 to 12-$m$, switching circuits (SWs) 13-1 to 13-$m$ and a pilot detector (PILOT DET) 14. Reference numerals without a sub-number denote components in the standby channel. Other components are included in the regular channels.

Figure 1A:
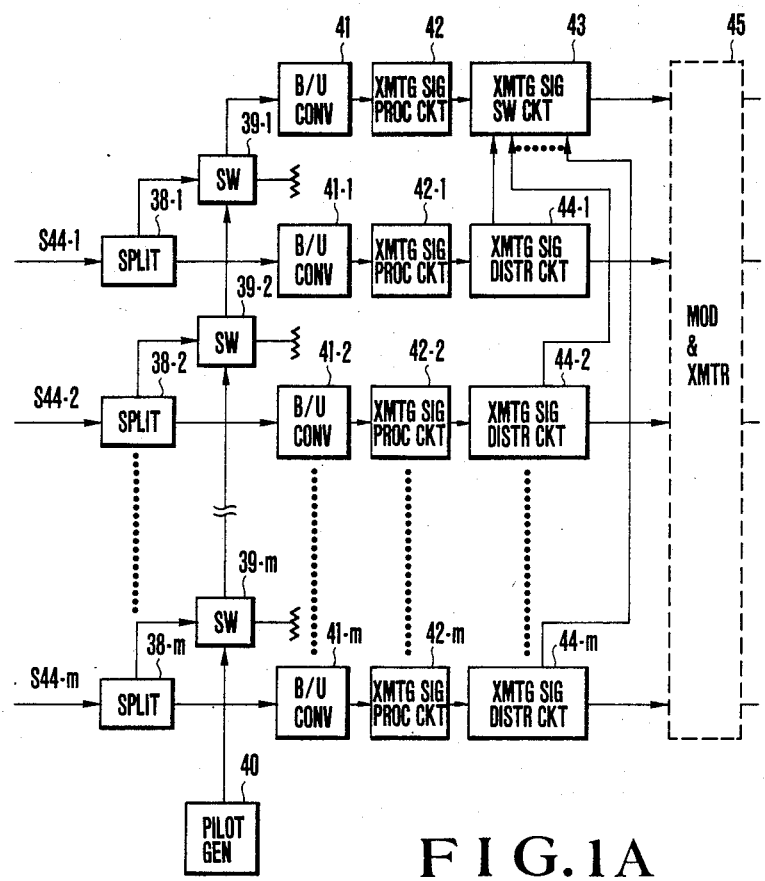
FIGS. 1A and 1B, is a block diagram showing the main part of a digital radio transmission circuit to which a conventional channel switching system is applied.
Figure 1B:
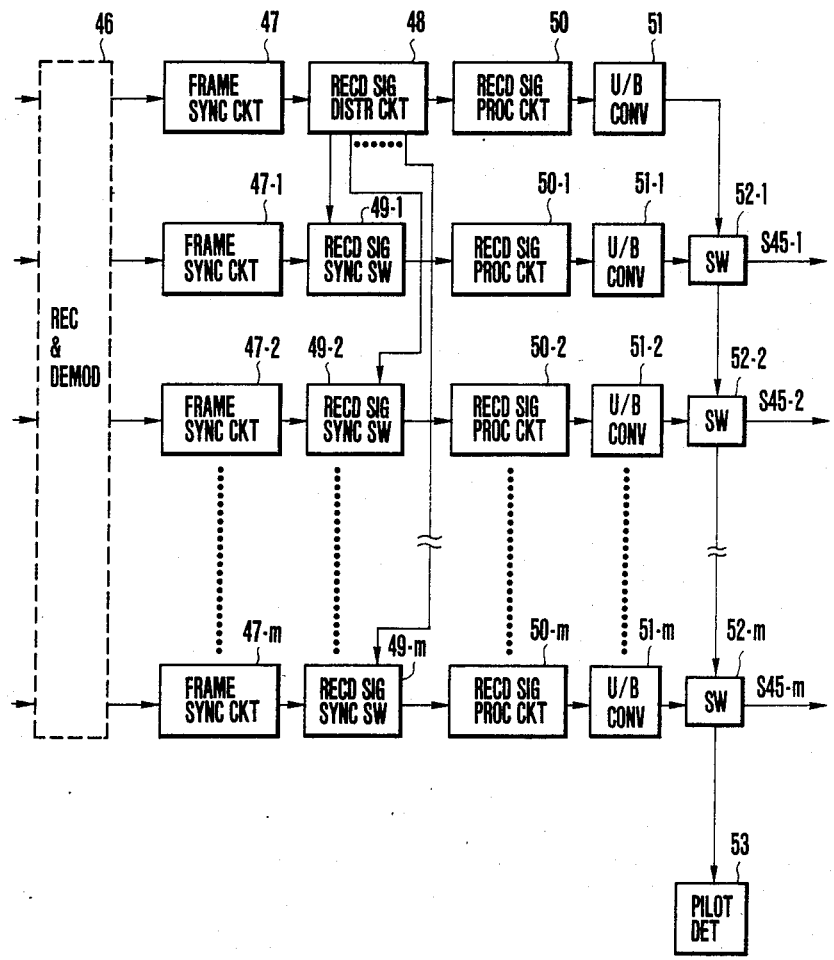

Referring to FIG. 2, digital multiplied signals S0-1, S0-2, . . . S0-$m$ from a predetermined multiplexer/demultiplexer unit are supplied to the split circuits 1-1, 1-2, . . . 1-$m$. First split signals are supplied to the B/U converters 4-1, 4-2, . . . 4-$m$, and second split signals are supplied to the switching circuits 2-1, 2-2, . . . 2-$m$, respectively. In normal operation, the digital multiplexed signals are supplied to the receiving side through the B/U converters 4-1, 4-2, . . . 4-$m$, the transmitting signal processing circuits 5-1, 5-2, . . . , 5-$m$ and the modulator/transmitter 6. A predetermined pilot signal from the pilot generator 3 arranged in the transmitting side is supplied to the B/U converter 4 in the standby channel through the switching circuits 2-1, 2-2, . . . 2-$m$ and is always supplied to the receiving side through the B/U converter 4, the transmitting signal processing circuit 5 and the modulator/transmitter 6. In this case, the major difference between the digital radio transmission circuit of this embodiment and the conventional digital radio transmission circuit adapting the conventional channel switching system as described above lies in the fact that the transmitting signal switching circuit 43 of the standby channel and the transmitting signal distribution circuits 44-1, 44-2, . . . 44-$m$ of the respective regular channels in FIG. 1 are omitted.

At the receiving side, the digital multiplexed signals of the respective regular channels which are received and demodulated through the receiver/demodulator 7 are sent as digital multiplexed signals S1-1, S1-2, . . . S1-$m$ to a predetermined multiplexer/demultiplexer unit through the frame sync circuits 8-1, 8-2, . . . 8-$m$, the received signal processing circuits 9-1, 9-2, . . . 9-$m$, the received signal hitless switching circuits 11-1, 11-2, . . . 11-m, the U/B converters 12-1, 12-2, . . . 12-m and the switching circuits 13-1, 13-2, . . . 13-m. In the standby channel at the receiving side, the pilot signal from the receiver/transmitter 7 is supplied to the pilot detector 14 through the frame sync circuit 8, the received signal processing circuit 9, the received signal supply circuit 10, the U/B converter 12 and the switching circuits 13-1, 13-2, . . . 13-m. The pilot signal has the same function as that of the conventional pilot signal.

An operation will be described wherein the standby channel is used in place of the second regular channel which has a circuit failure. The main means for performing hitless channel switching comprises switching circuits 2-1, 2-2, . . . 2-m at the transmitting side. When the switching circuit 2-2 is operated to switch the second regular channel to the standby channel in accordance with a predetermined protocol, the digital multiplexed signal S0-2 is supplied to the receiving side through the second regular channel and is supplied in place of the pilot signal to the receiving side through the switching circuit 2-2, the B/U converter 4, the transmitting signal processing circuit 5 and the modulator/transmitter 6 corresponding to the standby channel.

The digital multiplexed signal sent through the radio transmission line for the second regular channel is supplied to the received signal hitless switching circuit 11-2 through the frame sync circuit 8-2 and the received signal processing circuit 9-2. Meanwhile, the digital multiplexed signal sent through the radio transmission line for the standby channel is supplied to the received signal hitless switching circuit 11-2 through the frame sync circuit 8, the received signal processing circuit 9 and the received signal supply circuit 10.

Figure 3A:
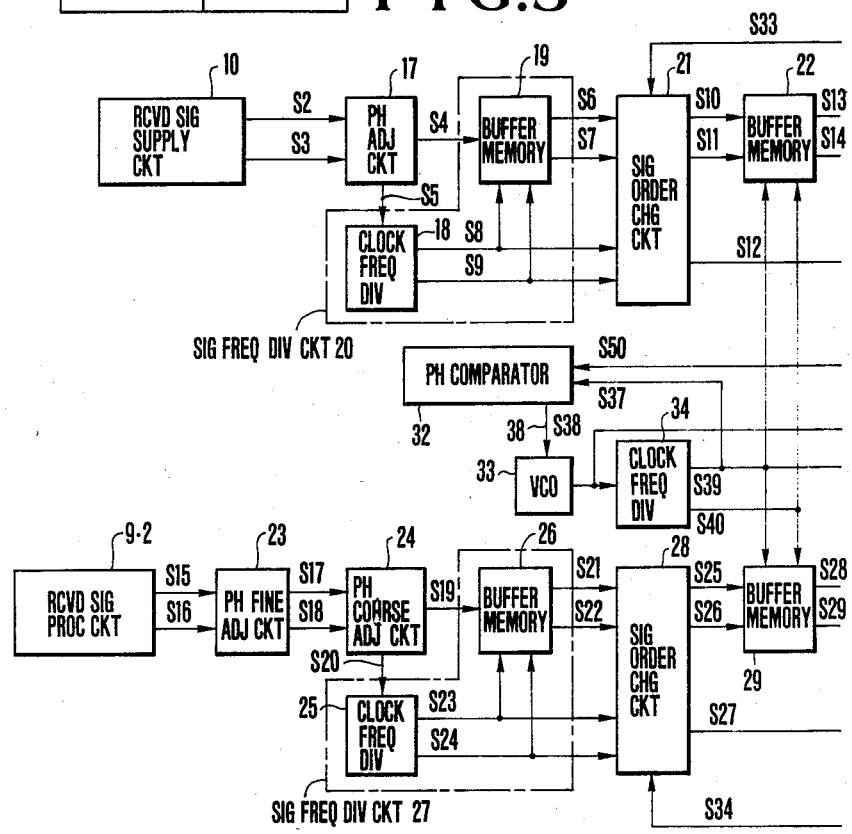
FIGS. 3A and 3B, is a block diagram showing the main part of a received signal hitless switching included in the circuit of FIG. 2.
Figure 3B:
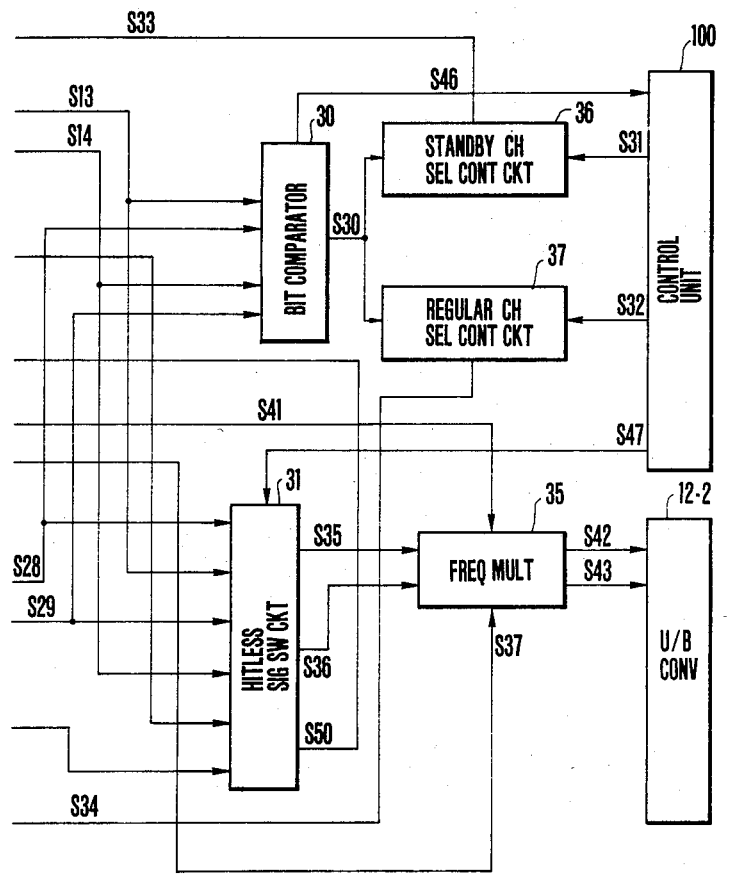

FIG. 3 shows the main part typically showing the received signal hitless switching circuit 11-2. The digital multiplexed signals of the second regular channel and the standby channel which are supplied to the received signal hitless switching circuit 11-2 comprise data signals of two strings. Referring to FIG. 3, "S plug number" along the lines between each two adjacent blocks represents a signal flowing therethrough. FIGS. 4A to 4L are timing charts of the signals shown in FIG. 3. The configuration and operation of the received signal hitless switching circuit 11-2 shown in FIG. 3 will be described hereinafter.

A data signal S2 and a clock signal S3 which are supplied from the received signal supply circuit 10 of the standby channel are supplied to a phase adjusting circuit 17 and are phase-shifted by a delay time inherent to equipment connected to the standby channel. The signals S2 and S3 are generated as a data signal S4 (FIG. 4C) and a clock signal S5 (FIG. 4D). Reference symbol n in FIGS. 4A to 4L denotes the number of bits representing a data length. The data signal S4 is supplied to a buffer memory 19 and is stored at a predetermined address thereof. Meanwhile, the clock signal S5 is supplied to a clock frequency divider 18. In this case, the data signal S2 comprises a data signal of two strings and is divided into two clock signals S8 and S9 (FIGS. 4I and 4J) having a phase difference of ½ bit. The clock signals S8 and S9 are supplied to the buffer memory 19 and a signal order change circuit 21. The data signal S4 stored at the predetermined address of the buffer memory 19 is read out in response to the two divided clock signals S8 and S9. Therefore, the readout signals are given as a data signal S6 (FIG. 4K) and a data signal S7 (FIG. 4L) which have a phase difference corresponding to ½ bit. The signals S6 and S7 are supplied to the signal order change circuit 21. The clock frequency divider 18 and the buffer memory 19 constitute a signal frequency divided circuit 20 for dividing the bipolar input signal S2 into bipolar signals S6 and S7. The waveforms of the clock signals S8 and S9 are switched over, and the signals having the switched waveforms are often generated. However, in the waveforms of the signals of FIGS. 4I and 4J, the data signal S4 (FIG. 4C) is divided into the signals S6 and S7 (FIGS. 4K and 4L).

In the same manner as in the standby channel, a data signal S15 and a clock signal S16 which are supplied through the regular channel are supplied as a data signal S17 and a clock signal S18 through a phase fine adjusting circuit 23 for finely adjusting the phase delay inherent to equipment connected to the regular channel. The signals S17 and S18 are then phase-adjusted by a phase coarse adjusting circuit 24. A data signal S19 shown in FIG. 4A is supplied to a buffer memory 26, and a clock signal S20 shown in FIG. 4B is supplied to a clock frequency divider 25. The behavior of a signal frequency divider consisting of the buffer memory 26 and the clock frequency divider 25 is the same as the standby channel signal frequency divider circuit 20 consisting of the buffer memory 19 and the clock frequency divider 18. The clock frequency divider 18 generates clock signals S23 and S24 (FIGS. 4E and 4F) having a phase difference corresponding to ½ bit. The clock signals S23 and S24 are supplied to the buffer memory 26 and the signal order change circuit 28. Data signals S21 and S22 (FIGS. 4G and 4H) having a phase difference corresponding to ½ bit are read out from the buffer memory 26 in response to the clock signals S23 and S24. The data signals S21 and S22 are supplied to the signal order change circuit 28. The clock signals S23 and S24 having the waveforms shown in FIGS. 4E and 4F can be reversed in accordance with the operating state of the clock frequency divider 25.

In this embodiment, the data signals are divided by the signal frequency divider circuits 20 and 27 for the following reason.

As is apparent from the relative relationship between the data signals S19 and S4 of the regular and standby channels, a phase difference between the propagation path lengths of the regular and standby channels is given such that the standby channel is delayed by about one bit from the regular channel. In this case, the received signal hitless switching circuit 11-2 cannot switch the data signal of the regular channel to that of the standby system. In order to establish a proper switching timing, the data and clock signals for the regular and standby channels are divided into halves by the signal frequency divider circuits 27 and 20 of FIG. 3, and the frequency-divided signals are supplied to the signal order change circuits 28 and 21. The data signals S21 and S22 and the data signals S6 and S7 of the regular and standby channels are given as shown in FIGS. 4G and 4H and FIGS. 4K and 4L, respectively. However, when the data signals S6 and S7 are switched, the data signals S7 and S21 and the data signals S6 and S22 can be compared at predetermined timings.

In this manner, input data signals and clock signals are frequency-divided, a bit error between the regular and standby channels, which is caused by a transmission path length difference in the radio transmission lines can be eliminated, thereby achieving hitless signal switching between the regular and standby channels.

Hitless switching cannot be performed between the regular and standby channels while the waveforms of the data signals in FIGS. 4G, 4H, 4K and 4L are given. This is due to indefinite operation timing of the clock frequency divider 18 in the standby channel. In order to solve this problem, the signal order change circuits 28 and 21 are arranged in the regular and standby channels. The data signal strings are changed in response to selection control signals S34 and S33 supplied from the regular and standby channel selection control circuits 37 and 36. An operation for switching from the regular channel to the standby channel will be described hereinafter. When the selection control signal S33 is not supplied to the signal order change circuit 21, the circuit 21 supplies input data signals S6 and S7 as data signals S10 and S11 to the buffer memory 22. In this case, the clock signal S8 corresponding to the data signal S6 is selected from the clock signals S8 and S9. The selected clock signal is supplied as the clock signal S12 to the hitless signal switching circuit 31. When the signal order change circuit 21 receives the signal S33, it changes the input data signals S6 and S7 to the data signals S11 and S10. In this case, the clock signal S9 is selected and serves as the clock signal S12.

The same operation as described above can be applied to the signal order change circuit 28. In this case, the input data signals S6 and S7 supplied to the signal order change circuit 21 are replaced with the signals S21 and S22; the input clock signals S8 and S9, the signals S23 and S24; the output data signals S10 and S11, the signals S25 and S26; the output clock signal S12, the signal S27; and the selection control signal S33, the signal S34.

The data signals S10 and S11 are read out from the buffer memory 22 in response to the clock signals S39 and S40 supplied from the clock frequency divider 34. The readout signals are supplied as the data signals S13 and S14 to the bit comparator 30 and the hitless signal switching circuit 31.

In the same manner as in the buffer memory 22, the data signals S25 and S26 are read out as the data sinals S28 and S29 from the buffer memory 29. The data signals S28 and S29 are supplied to the bit comparator 30 and the hitless signal switching circuit 31.

The clock signals S39 and S40 are obtained such that the output from a voltage-controlled oscillator 33 is ½ divided by a clock frequency divider 34. The oscillation frequency of the voltage-controlled oscillator 33 is controlled by a phase error signal S38 supplied from a phase comparator 32. The phase comparator 32 compares a clock signal S50 supplied from the hitless signal switching circuit 31 with the clock signal S39 and generates the phase error signal S38. The clock signal S50 corresponds to and is finally synchronized with the standby channel clock signal when the regular channel is switched to the standby channel. However, when the standby channel is switched to the regular channel, the clock signal S50 corresponds to and is finally synchronized with the regular channel clock signal.

The bit comparator 30 compares data strings of the data signals S28 and S29 supplied from the buffer memories 29 and 22 with the corresponding data strings of data signals S13 and S14 in units of bits. The bit comparator 30 generates an output signal S30 of logic "1" or "0" in accordance with a coincidence or noncoincidence between bits of the corresponding data strings. When the bit comparator 30 detects coincidence/noncoincidence, it supplies a signal S46 to a control unit 100. When the signal S46 represents a coincidence, a regular channel switching control signal S47 is supplied from the control unit 100 to the hitless signal switching circuit 31. Otherwise, the control unit 100 does not supply the signal S47 thereto. The output signal from the bit comparator 30 is supplied to the standby channel selection control circuit 36 and the regular channel selection control circuit 37. The standby channel selection control circuit 36 receives the signal S30 and the standby channel switching control signal S31 from the control unit 100 and generates the selection control signal S33 in accordance with the AND operation. The signal S33 is supplied to the signal order change circuit 21. The data signals S10 and S11 generated from the signal order change circuit 21 in response to the selection control signal S33 are changed to correspond to the data signals S7 and S6 shown in FIGS. 4L, and 4K, respectively. The clock signal S12 is supplied to the hitless signal switching circuit 31 in response to a clock signal selected in correspondence with the clock signal S9 shown in FIG. 4J.

The operation sequence for supplying the data signals from the signal order change circuits 28 and 21 to the bit comparator 30 and the hitless signal switching circuit 31 through the buffer memories 29 and 22 is given as described above. The bit comparator 30 compares the bits of the data strings of the data signals S28 and S29 supplied from the buffer memories 29 and 22 with those of the corresponding data strings of the data signals S13 and S14. Unlike in the case described above, since the data strings of the data signals S13 and S14 along the standby channel are switched by the signal order change circuit 21, the bits of the data signal S28 (FIG. 4G) are compared with those of the data signal S13 (FIG. 4L). At the same time, the bits of the data signal S29 (FIG. 4H) are compared with those of the data signal S14 (FIG. 4K). As is apparent from the relationships between FIGS. 4G and 4L and between the FIG. 4H and 4K, the corresponding data signal strings are discriminated to coincide with each other although ½ bit phase difference is actually present. The signal S30 from the bit comparator 30 represents a coincidence and is supplied to the regular and standby channel selection control circuits 37 and 36. At the same time, the data signal S46 representing the coincidence is supplied to the control unit 100. In this state, the standby channel selection control circuit 36 does not generate the selection control signal S33.

Upon reception of the coincidence signal S46 from the bit comparator 30, the control unit 100 supplies the predetermined regular/standby channel switching signal S47 to the hitless signal switching circuit 31. At this moment, the regular channel data signals S28 and S29 and the standby channel data signals S13 and S14 which have bit arrays matched therewith are supplied to the hitless signal switching circuit 31. At the same time, the regular channel clock signal S27 and the standby channel clock signal S12 are also supplied to the hitless signal switching circuit 31. The regular channel data signals S28 and S29 are instantaneously switched to the standby channel data signals S13 and S14 in response to the regular/standby switching signal S47. The regular channel clock signal S27 is switched to the standby channel clock signal S12. The data signals are switched without an interruption and appear as the data signals S35 and S36. The signals S35 and S36 are supplied to a frequency multiplier 35. The clock signals are switched by the hitless signal switching circuit 31. However, these signals are supplied through the voltage-controlled oscillator 33, so that the phase of the clock signal is gradually shifted to obtain an optimal phase for sampling the standby data while an abrupt change in phase during switching is prevented. The selected standby channel clock signal S50 is supplied as a reference signal of a phase-locked system to the phase comparator 32. The phase comparator 32 generates the clock signals S39 and S40 for reading out the data signals from the buffer memories 29 and 22. The reference signal is also used to generate a clock signal S41 having the same frequency as in the original clock signal (i.e., the clock signal before frequency division) from the voltage-controlled oscillator 33. The clock signal S41 is supplied to the frequency multiplier 35. The data signals S35 and S36 stored at the predetermined addresses of the frequency multiplier 35 in response to the clock signal S37 are read out in response to the clock signal S41 which has the original frequency and which is supplied from the voltage-controlled oscillator 33. Furthermore, the two data strings are converted to a data string and generated as a data signal S42. At the same time, a clock signal S43 corresponding to the clock signal S41 is generated. The signals S42 and S43 are supplied to the U/B converter 12-2 (FIG. 2). It should be noted that the regular channel switching control signal S32, the standby channel switching control signal S31, the bit coincidence signal S46 and the regular/standby switching control signal S47 shown in FIG. 3 are omitted in FIG. 2.

Referring to FIG. 2, the standby channel data and clock signals switched by the received signal hitless switching circuit 11-2 are supplied to the U/B converter 12-2 and are subjected to predetermined signal format conversion processing. The converted signals are supplied to the predetermined multiplexer/demultiplexer unit through the switching circuit 13-2.

In the above embodiment, the regular and standby channel data signals supplied to the received signal hitless switching circuit 11-2 comprise data signals of two strings. However, the present invention can be applied to a case when the data signal comprises a data signal of more than two strings. In the above embodiment, the data signal of the regular channel is switched to the data signal of the standby channel. However, the same switching operation can be performed to obtain the same effect when the standby channel is switched to the regular channel.

According to the present invention as described in detail above, the data signal of a regular channel subjected to channel switching and the data signal of the standby channel are divided at a frequency division ratio of N (N is an integer of 1 or more). When the bits of the data signals of the regular and standby channels do not coincide with each other, the order of one of the data strings of the N-divided data signals is changed to establish a coincidence between the regular and standby channel data signals. Under this condition, channel switching is performed, thereby omitting the transmitting signal distribution circuits at the transmitting side, and hence reducing the system scale. At the same time, the switching control between the regular and standby channels can be simplified, and channel switching time can be shortened.

What is claimed is:

1. A channel switching system in a digital radio transmission circuit having at least one regular channel and a standby channel, each channel being arranged to transmit a digital multiplexed signal including a data signal of N (N is an integer of not less than (1) strings, said channel switching system having a transmitting side for transmitting the data signal and a receiving side for receiving the data signal transmitted from the transmitting side, said receiving side of the channel switching system, comprising:

receiving signal supply means for supplying to said regular channel and data signal received through said standby channel in accordance with a circuit failure of a given regular channel;

signal frequency-dividing means for N frequency-dividing a data signal received through said regular channel and the data signal supplied from said received signal supply means and generating N signal strings;

signal order changing means for receiving the N signal strings from said signal frequency-dividing means, the signal strings respectively corresponding to said regular and standby channels, for changing an order of a signal string within the N signal strings corresponding to said regular and standby channels in response to different control signals, and for generating output N signal strings of said regular and standby channels;

comparing means for comparing bits of the N signals strings of said regular and standby channels which are generated by said signal order changing means, to output a concidence signal or a noncoincidence signal when a result of the comparison represents a coincidence of a noncoincidence, respectively, said noncoincidence signal being supplied to said signal order changing means as said control signal;

hitless signal switching means for receiving the N signal strings from said signal order changing means and generating a selected one of the N signal strings of said regular and standby channels in accordance with the coincidence signal from said comparing means; and frequency multiplying means for receiving and multiplying with N an output from said hitless signal switching means, and generating an N-multiplied signal.

2. A system according to claim 1, wherein said signal frequency-dividing means comporise first buffer memory means for storing the data signal supplied through said regular and standby channels, and clock frequency dividers for N frequency-dividing clock signals supplied through said regular and standby channels and generating frequency-divided clock signals as read signal to access said buffer memory means.

3. A system according to claim 1, further comprising another buffer memory means for temporarily storing output signals from said signal order changing means and supplying the signals to said comparing means and said hitless signal switching means, and read clock generating means for generating clock signals to read out the respective signal strings, said read clock generating means being controlled by a phase difference between one of the input clock signals supplied thereto and a clock signal selected by said hitless signal switching means.

4. A system according to claim 1, wherein said comparing means comprise a comparator for comparing the N signal strings to determine a coincidence or noncoincidence and generating signals having opposite logical values in accordance with a comparison result, a control unit for inhibiting supply of a switching signal for switching said hitless signal switching means when the noncoincidence is established, for supplying the switching signal to said hitless signal switching means when the coincidence is established, and for generating a channel selection signal for selecting one of said regular and standby channels, and a channel selection circuit for supplying the signal order change control signal to one of said signal order change means of said regular and standby channels when an output from said comparator coincides with a logical value of the channel selection signal from said control unit.

* * * * *

UNITED STATES PATENT AND TRADEMARK OFFICE
CERTIFICATE OF CORRECTION

PATENT NO. : 4,686,675
DATED : August 11, 1987
INVENTOR(S) : H. MORIMOTO et al

It is certified that error appears in the above-identified patent and that said Letters Patent is hereby corrected as shown below:

COLUMN 1, LINE 57 Delete "7-2", insert --47-2--;

COLUMN 4, LINE 5 After "switching" insert --circuit--;

LINE 13 After "will be" insert --described--;

LINE 20 After "m th" insert --regular--;

LINE 22 After "a" insert --pilot--;

LINE 23 Delete "(B/U" insert --(B/U CONU)4,--;

COLUMN 10, LINE 2 After "than" delete "(1)" insert --1)--;

LINE 45 Delete "comporise" insert --comprise--.

Signed and Sealed this

Sixth Day of September, 1988

Attest:

DONALD J. QUIGG

*Attesting Officer*  *Commissioner of Patents and Trademarks*